United States Patent
Schrell

(10) Patent No.: US 10,428,763 B2
(45) Date of Patent: Oct. 1, 2019

(54) CONTROLLING A RELATIVE POSITION AT AN INTERFACE BETWEEN TRANSLATING STRUCTURES OF AN AIRCRAFT NACELLE

(71) Applicant: Rohr, Inc., Chula Vista, CA (US)

(72) Inventor: Johann S. Schrell, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 706 days.

(21) Appl. No.: 15/088,761

(22) Filed: Apr. 1, 2016

(65) Prior Publication Data

US 2017/0284337 A1    Oct. 5, 2017

(51) Int. Cl.
| | | |
|---|---|---|
| *F02K 1/64* | (2006.01) | |
| *F02K 1/60* | (2006.01) | |
| *F02K 1/76* | (2006.01) | |
| *B64D 29/06* | (2006.01) | |
| *F02K 1/72* | (2006.01) | |

(52) U.S. Cl.
CPC .............. *F02K 1/605* (2013.01); *B64D 29/06* (2013.01); *F02K 1/72* (2013.01); *F02K 1/766* (2013.01); *F05D 2260/30* (2013.01); *F05D 2260/36* (2013.01)

(58) Field of Classification Search
CPC . F02K 1/605; F02K 1/72; F02K 1/766; F02K 1/80; F02K 1/805; B64D 29/06; F05D 2260/30; F05D 2260/36
See application file for complete search history.

(56) References Cited

U.S. PATENT DOCUMENTS

| | | | |
|---|---|---|---|
| 5,778,659 A * | 7/1998 | Duesler | ..................... F02K 1/09 239/265.27 |
| 5,806,302 A | 9/1998 | Cariola et al. | |
| 6,170,254 B1 | 1/2001 | Cariola | |
| 6,179,249 B1 | 1/2001 | Canadas | |
| 6,340,135 B1 | 1/2002 | Barton | |
| 6,604,355 B1 | 8/2003 | Sternberger | |
| 7,484,356 B1 | 2/2009 | Lair | |
| 8,181,905 B2 | 5/2012 | McDonough et al. | |
| 8,469,309 B2 | 6/2013 | Stuart et al. | |
| 8,740,137 B2 | 6/2014 | Vauchel et al. | |
| 8,876,042 B2 | 11/2014 | LaChapelle et al. | |
| 8,919,668 B2 | 12/2014 | Vauchel et al. | |
| 9,003,810 B2 | 4/2015 | Porte et al. | |
| 9,021,848 B2 | 5/2015 | Leacock et al. | |
| 9,188,026 B2 | 11/2015 | Calder et al. | |
| 9,228,532 B2 | 1/2016 | Aten et al. | |

(Continued)

*Primary Examiner* — Steven M Sutherland
(74) *Attorney, Agent, or Firm* — O'Shea Getz P.C.

(57) ABSTRACT

A nacelle is provided for an aircraft propulsion system. This nacelle includes a stationary support, a fanlet, a thrust reverser sleeve and an interface assembly providing an interface between the stationary support, the fanlet and the thrust reverser sleeve where the fanlet and the thrust reverser sleeve are respectively in stowed positions. The stationary support extends circumferentially about an axial centerline. The fanlet includes an inlet structure and a fan cowl. The fanlet is configured to translate axially along the centerline. The thrust reverser sleeve is configured to translate axially along the centerline. The interface assembly includes a pair of interlocking components, wherein a first of the interlocking components is mounted to the fanlet at the aft end of the fanlet.

13 Claims, 4 Drawing Sheets

(56) References Cited

U.S. PATENT DOCUMENTS

| | | | |
|---|---|---|---|
| 2011/0308634 A1* | 12/2011 | Mouton | B64D 29/06 137/15.1 |
| 2012/0228403 A1* | 9/2012 | Caruel | F02K 1/72 239/265.11 |
| 2013/0220435 A1 | 8/2013 | James | |
| 2014/0116024 A1* | 5/2014 | Channel | F02K 1/72 60/226.2 |
| 2015/0107222 A1 | 4/2015 | Aten | |
| 2015/0110613 A1 | 4/2015 | Aten | |
| 2015/0267643 A1 | 9/2015 | Gonidec et al. | |
| 2015/0285144 A1 | 10/2015 | Todorovic et al. | |
| 2015/0308376 A1 | 10/2015 | James | |
| 2015/0308378 A1 | 10/2015 | Aten | |

\* cited by examiner

CONTROLLING A RELATIVE POSITION AT AN INTERFACE BETWEEN TRANSLATING STRUCTURES OF AN AIRCRAFT NACELLE

BACKGROUND OF THE INVENTION

1. Technical Field

This disclosure relates generally to an aircraft propulsion system and, more particularly, to a nacelle with translatable structures such as, for example, a translating fanlet and a translating thrust reverser.

2. Background Information

Some modern nacelle designs include multiple translatable structures which meet one another at an interface when stowed. Air turbulence, vibrations induced by turbine engine operation, and other effects may cause these translatable structures to move relative to one another at the interface when stowed. This relative movement may create excessive airflow impediments, which increase the amount of drag produced by the nacelle at the interface.

There is a need in the art for controlling the relative position between translatable structures of an aircraft nacelle at an interface between those translatable structures.

SUMMARY OF THE DISCLOSURE

According to an aspect of the present disclosure, a nacelle is provided for an aircraft propulsion system. This nacelle includes a stationary support, a fanlet, a thrust reverser sleeve and an interface assembly, which provides an interface between the stationary support, the fanlet and the thrust reverser sleeve where the fanlet and the thrust reverser sleeve are respectively in stowed positions. The stationary support extends circumferentially about an axial centerline. The fanlet includes an inlet structure and a fan cowl. The fanlet is configured to translate axially along the centerline. The thrust reverser sleeve is configured to translate axially along the centerline. The interface assembly is configured to maintain a relative position between an aft end of the fanlet and a forward end of the thrust reverser sleeve at the interface. The interface assembly includes a pair of interlocking components, wherein a first of the interlocking components is mounted to the fanlet at the aft end of the fanlet.

According to another aspect of the present disclosure, another nacelle is provided for an aircraft propulsion system. This nacelle includes a stationary support, a forward nacelle structure, an aft nacelle structure and an interface assembly, which provides an interface between the stationary support, the forward nacelle structure and the aft nacelle structure where the forward nacelle structure and the aft nacelle structure are respectively in the stowed positions. The stationary support extends circumferentially about an axial centerline. The forward nacelle structure is configured to translate axially along the centerline between a stowed position and a deployed position. The aft nacelle structure is configured to translate axially along the centerline between a stowed position and a deployed position. The interface assembly is configured to maintain, at the interface, (A) a predetermined axial gap between an aft end of the forward nacelle structure and a forward end of the aft nacelle structure, and (B) an exterior surface of the forward nacelle structure substantially radially flush with an exterior surface of the aft nacelle structure. The interface assembly includes a pair of interlocking components, wherein a first of the interlocking components is mounted to the forward nacelle structure at the aft end of the forward nacelle structure.

According to another aspect of the present disclosure, still another nacelle is provided for an aircraft propulsion system. This nacelle includes a stationary support, a forward nacelle structure, an aft nacelle structure and an interface assembly at an interface between the stationary support, the forward nacelle structure and the aft nacelle structure where the forward nacelle structure and the aft nacelle structure are respectively in the stowed positions. The stationary support extends circumferentially about an axial centerline. The forward nacelle structure is configured to translate axially along the centerline between a stowed position and a deployed position. The aft nacelle structure is configured to translate axially along the centerline between a stowed position and a deployed position. The interface assembly includes a pair of interlocking components, wherein a first of the interlocking components is mounted to the forward nacelle structure at the aft end of the forward nacelle structure, and wherein a second of the interlocking components is mounted to the stationary support.

According to another aspect of the present disclosure, still another nacelle is provided for an aircraft propulsion system. This nacelle includes a fanlet, a thrust reverser sleeve and an interface assembly, which provides an interface between the fanlet and the thrust reverser sleeve where the fanlet and the thrust reverser sleeve are respectively in stowed positions. The fanlet is configured to translate axially along the centerline. The thrust reverser sleeve is configured to translate axially along the centerline. The interface assembly is configured to maintain a relative axial and radial position between an aft end of the fanlet and a forward end of the thrust reverser sleeve at the interface. The interface assembly includes a plurality of interlocking components. A first of the interlocking components is mounted to the fanlet at the aft end of the fanlet. A second of the interlocking components is mounted to the thrust reverser sleeve at the forward end of the thrust reverser sleeve.

According to another aspect of the present disclosure, still another nacelle is provided for an aircraft propulsion system. This nacelle includes a fanlet, a thrust reverser sleeve and an interface assembly at an interface between the fanlet and the thrust reverser sleeve where the fanlet and the thrust reverser sleeve are respectively in stowed positions. The fanlet is configured to translate axially along the centerline. The thrust reverser sleeve is configured to translate axially along the centerline. The interface assembly includes a plurality of interlocking components. A first of the interlocking components is mounted to the fanlet at the aft end of the fanlet. A second of the interlocking components is mounted to the thrust reverser sleeve at the forward end of the thrust reverser sleeve.

A second of the interlocking components may be mounted to the forward end of the aft nacelle structure. Alternatively, the second of the interlocking components may be mounted to the stationary support.

The first of the interlocking components may be configured to interlock with the second of the interlocking components at the interface.

A stationary support may extend circumferentially about the centerline. A third of the interlocking components may be mounted to the stationary support and/or may be configured to interlock with the first of the interlocking components at the interface. A fourth of the interlocking components may be mounted to the stationary support and/or may be configured to interlock with the second of the interlocking components at the interface.

The relative position may be a relative axial and/or radial position.

The interface assembly may be configured to maintain the relative position between the aft end of the fanlet and the forward end of the thrust reverser sleeve such that: (A) a predetermined axial gap is maintained between the aft end of the fanlet and the forward end of the thrust reverser sleeve; and/or (B) an exterior surface of the fanlet is substantially radially flush with an exterior surface of the thrust reverser sleeve.

The first of the interlocking components may be configured with an aperture. A second of the interlocking components may be configured with a projection that extends axially into the aperture where the second of the interlocking components is mated with the first of the interlocking components.

The interface assembly may include a lock configured to selectively lock the interlocking components together where the fanlet and the thrust reverser sleeve are respectively in the stowed positions.

The second of the interlocking components may be mounted to the thrust reverser sleeve at the forward end of the thrust reverser sleeve.

The interface assembly may include a rub strip disposed radially between and contacting the first of the interlocking components and the stationary structure.

The second of the interlocking components may be mounted to the stationary structure.

The interface assembly may include a rub strip disposed radially between and contacting the fanlet and the stationary structure.

The interface assembly may include a pair of second interlocking components. A first of the second interlocking components may be mounted to the thrust reverser sleeve at the forward end of the thrust reverser sleeve. A second of the second interlocking components may be mounted to the stationary support.

The first of the interlocking components may be configured with an aperture. The second of the interlocking components may be configured with a projection that extends axially into the aperture where the second of the interlocking components is mated with the first of the interlocking components. In addition or alternatively, the first of the second interlocking components may be configured with a second aperture. The second of the second interlocking components may be configured with a second projection that extends axially into the second aperture where the second of the second interlocking components is mated with the first of the second interlocking components.

The interface assembly may include a lock configured to selectively lock the second interlocking components together where the thrust reverser sleeve is in the stowed position.

The interface assembly may include a rub strip disposed radially between and contacting the thrust reverser sleeve and the stationary structure.

The foregoing features and the operation of the invention will become more apparent in light of the following description and the accompanying drawings.

DETAILED DESCRIPTION OF THE INVENTION

Figure 1:
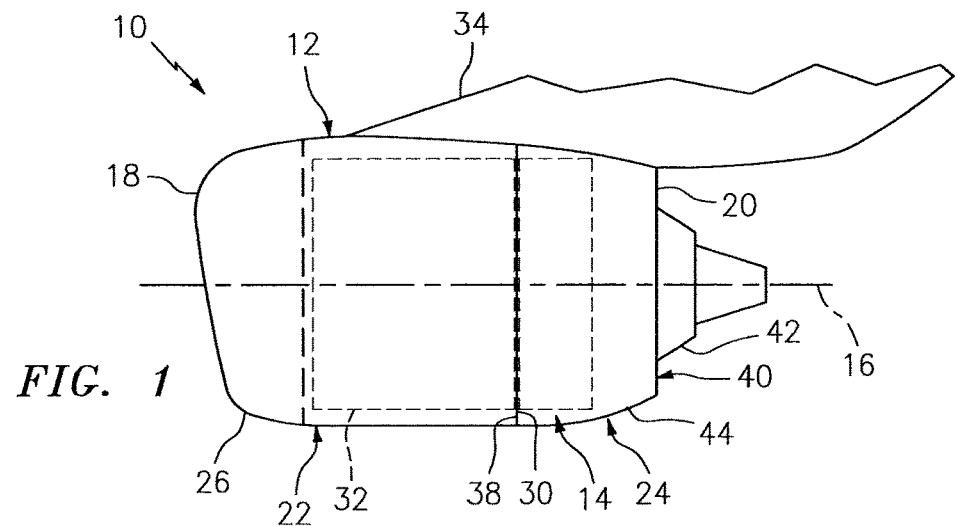
FIG. 1 is a side illustration of an aircraft propulsion system with a translatable fanlet and a translatable thrust reverser sleeve in stowed positions.

FIG. 1 illustrates an aircraft propulsion system 10 for an aircraft such as a commercial airliner. The propulsion system 10 includes a nacelle 12 and a gas turbine engine. This gas turbine engine may be configured as a turbofan engine. Alternatively, the gas turbine engine may be configured as a turbojet engine or any other type of gas turbine engine capable of propelling the aircraft. The propulsion system 10 also includes a thrust reverser system 14 configured with the nacelle 12; see also FIG. 3.

The nacelle 12 circumscribes the gas turbine engine to provide an aerodynamic covering for the gas turbine engine. The nacelle 12 also forms a bypass gas path with the gas turbine engine, whereby air from the engine's turbofan is routed through the bypass gas path and around a core of the gas turbine engine and generates a majority (e.g., more than 75%) of engine thrust out of the aircraft propulsion system 10 in the case of a turbofan engine configuration.

The nacelle 12 extends along an axial centerline 16 between a forward nacelle end 18 and an aft nacelle end 20. The nacelle 12 includes a forward nacelle structure 22 and an aft nacelle structure 24.

The forward nacelle structure 22 may be configured as a fanlet, and is referred to below as a fanlet for ease of description. This fanlet 22 includes an inlet structure 26 (e.g., cowl or module) and a fan cowl 28. Of course in other embodiments, the fanlet 22 may also include one or more additional structures/components such as an acoustic inner barrel, etc.

The inlet structure 26 is disposed at the forward nacelle end 18. The inlet structure 26 is configured to direct a stream of air through an inlet orifice at the forward nacelle end 18 and into the propulsion system 10 towards the gas turbine engine. The fan cowl 28 is disposed at an aft end 30 of the fanlet 22 and extends axially between the inlet structure 26 and the aft nacelle structure 24. The fan cowl 28 may be generally axially aligned with a fan section of the gas turbine engine. The fan cowl 28 is configured to provide an aerodynamic covering for a fan case 32 (see also FIG. 2) which circumscribes the fan section.

Figure 2:
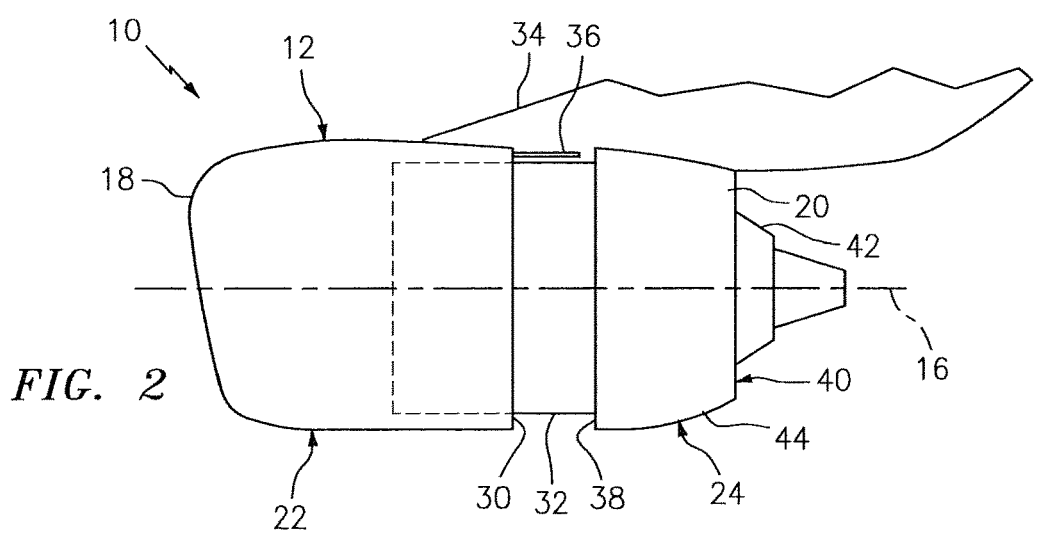
FIG. 2 is a side illustration of the aircraft propulsion system with the fanlet in a partially deployed position and the thrust reverser sleeve in the stowed position.

Referring to FIGS. 1 and 2, the fanlet 22 is configured as a cohesive, translatable structure. In particular, the inlet structure 26 forms a forward portion of the fanlet 22 and the fan cowl 28 forms an aft portion of the fanlet 22. The fanlet 22 is slidably connected to a stationary structure 34, such as a pylon for the aircraft propulsion system 10 (or another structure such as the fan case 32), through rails 36 (see FIG. 2) mounted on opposing sides of the stationary structure 34 and/or other suitable translatable joints. In this manner, the entire fanlet 22 including the inlet structure 26 and the fan cowl 28 may translate axially along the centerline 16 as shown in FIGS. 1 and 2. The fanlet 22 may thereby move axially between a stowed position (see FIG. 1) and a fully deployed position, where FIG. 2 illustrates the fanlet 22 in a partially-deployed position. In the stowed position, the inlet structure 26 and the fan cowl 28 provide the functionality described above. In the partially-deployed position and the fully deployed position, the fanlet 22 at least partially (or substantially completely) uncovers at least the fan case 32 and devices and systems mounted thereto (not shown for ease of illustration). This may facilitate propulsion system 10 assembly and maintenance.

Referring to FIG. 1, the aft nacelle structure 24 is disposed at the aft nacelle end 20 and extends axially between a forward end 38 thereof and the aft nacelle end 20. The aft nacelle structure 24 is configured to provide an outer boundary for an axial portion of the bypass gas path, which extends through the propulsion system 10 to a bypass gas path exhaust nozzle 40. The aft nacelle structure 24 may also form the exhaust nozzle 40 in conjunction with an inner fairing assembly 42 (e.g., an inner fixed structure), which houses the core of the gas turbine engine. The aft nacelle structure 24 may be configured as or otherwise include a thrust reverser sleeve 44 for the thrust reverser system 14, which may also be referred to as a translating sleeve. The aft nacelle structure 24 may also include other components such as, but not limited to, blocker doors, etc.

The thrust reverser sleeve 44 may have a substantially tubular unitary sleeve body; e.g., may extend more than 330 degrees around the centerline 16. Alternatively, the thrust reverser sleeve 44 may include a pair of sleeve segments (e.g., halves) arranged on opposing sides of the propulsion system 10. The present disclosure, however, is not limited to the foregoing exemplary sleeve configurations.

Figure 3:
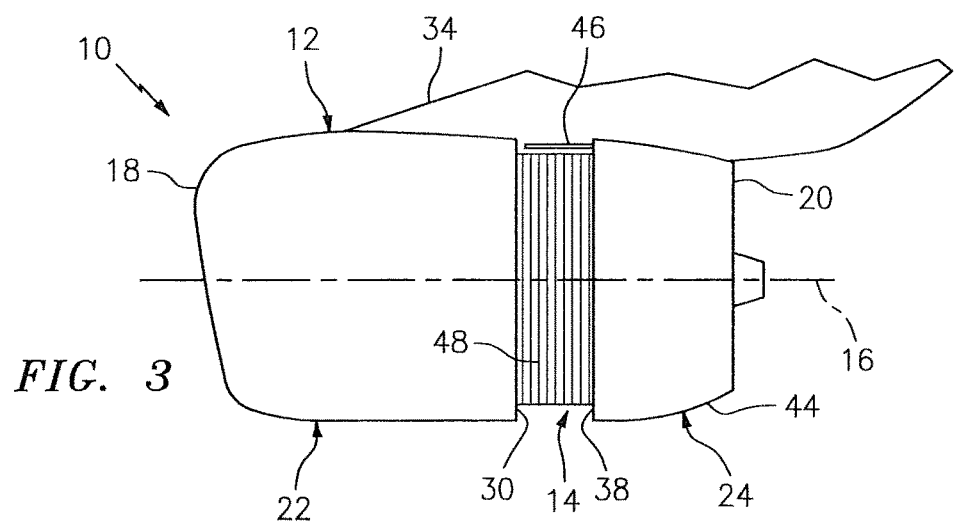
FIG. 3 is a side illustration of the aircraft propulsion system with the fanlet in the stowed position and the thrust reverser sleeve in a fully deployed position.

Referring to FIGS. 1 and 3, the aft nacelle structure 24 and, more particularly, the thrust reverser sleeve 44 is configured as a translatable structure. The thrust reverser sleeve 44, for example, is slidably connected to the stationary structure 34 (e.g., the pylon) through rails 46 (see FIG. 3) and track beams (not shown) mounted on opposing sides of the stationary structure 34 and/or other suitable translatable joints. In this manner, the thrust reverser sleeve 44 and, in the embodiment of FIGS. 1 and 3, the entire aft nacelle structure 24 may translate axially along the centerline 16. The thrust reverser sleeve 44 may thereby move axially between a stowed position (see FIG. 1) and a fully deployed position (see FIG. 3). In the stowed position, the aft nacelle structure 24 provides the functionality described above. In the fully deployed position, the thrust reverser sleeve 44 at least partially (or substantially completely) uncovers at least one or more other components of the thrust reverser system 14 such as, but not limited to, one or more cascades 48 of forward-turning vanes.

Figure 4:
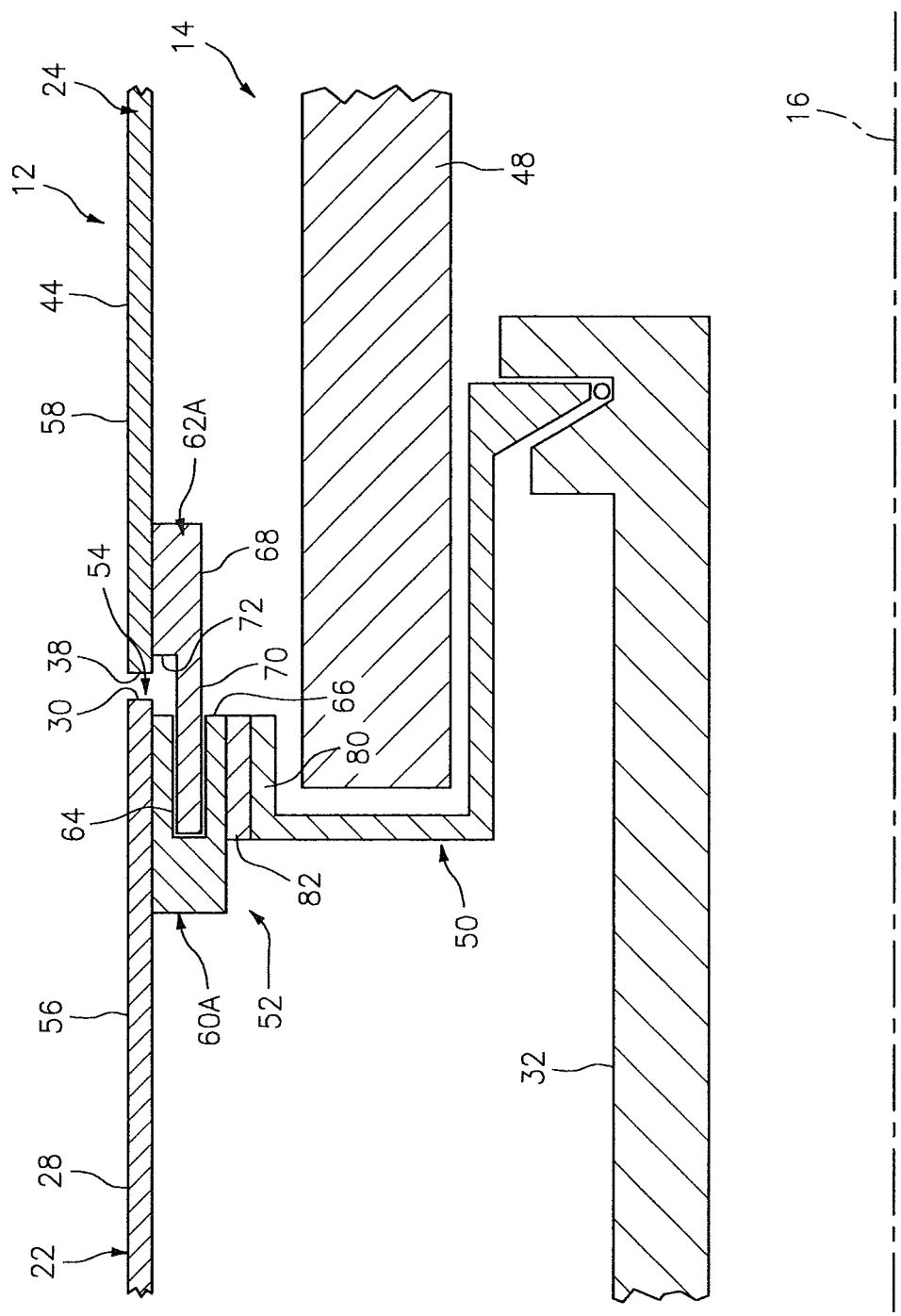
FIG. 4 is a side sectional illustration of a portion of the aircraft propulsion system at an interface between the fanlet and the thrust reverser sleeve.

Referring now to FIG. 4, the nacelle 12 also includes a stationary support 50 and an interface assembly 52. The stationary support 50 extends circumferentially about the centerline 16 and substantially circumscribes the fan case 32. The stationary support 50, for example, may include a pair of parti-annular segments (e.g., halves) arranged on opposing sides of the propulsion system 10. Alternatively, the stationary support 50 may have a substantially annular unitary body; e.g., may extend as much as or more than 330 degrees around the centerline 16.

The stationary support 50 is configured to provide a structural support member for the fanlet 22 and the thrust reverser sleeve 44 as described below in further detail. The stationary support 50 may also be configured as a torque box for the thrust reverser system 14. This stationary support 50 is mounted to the fan case 32 at (e.g., on, adjacent or proximate) the aft end 30 of the fan case 32 through a known V-blade and V-groove arrangement, or any other suitable arrangement.

The interface assembly 52 is configured to provide an interface between the stationary support 50, the fanlet 22 and the thrust reverser sleeve 44 when the fanlet 22 and the thrust reverser sleeve 44 are in the stowed positions. The interface assembly 52 is further configured to maintain a relative axial and/or radial position (e.g., step and gap) between the aft end 30 of the fanlet 22 and the forward end 38 of the thrust reverser sleeve 44 at (e.g., on, adjacent or proximate) the interface and, thus, when the fanlet 22 and the thrust reverser sleeve 44 are in the stowed positions. For example, the interface assembly 52 may maintain a predetermined axial gap 54 between the aft end 30 of the fanlet 22 and the forward end 38 of the thrust reverser sleeve 44. The interface assembly 52 may also or alternatively maintain an exterior surface 56 of the fanlet 22 substantially flush with an exterior surface 58 of the thrust reverser sleeve 44 so as to reduce aerodynamic drag from air flowing over the nacelle 12 at the interface.

The interface assembly 52 includes a plurality of interlocking components 60 and 62, which are configured to interface with one another when the fanlet 22 and the thrust reverser sleeve 44 are in the stowed positions so as to maintain the relative axial and/or radial position as described above. In the specific embodiment of FIG. 4, the interface assembly 52 includes a pair of interlocking components 60A and 62A.

The first interlocking component 60A is configured with an aperture 64 such as, but not limited to, a groove. This aperture 64 extends axially partially into the first interlocking component 60A from an axial (e.g., aft) end 66 thereof. The aperture 64 may extend laterally (e.g., circumferentially or tangentially) within the first interlocking component 60A. Alternatively, the aperture 64 may extend laterally through the first interlocking component 60A.

The second interlocking component 62A is configured with a base 68 and a projection 70. The projection 70 extends axially out from an axial (e.g., forward) end 72 of the base 68 to a distal projection end. The projection 70 is configured to extend axially into and thereby mate with the aperture 64 when the interlocking components 60A and 62A are mated together. A radial thickness of the projection 70 is sized relative to the aperture 64 such that the projection 70 significantly limits or eliminates radial movement between the mated interlocking components 60A and 62A and, thus, the stowed fanlet 22 and thrust reverser sleeve 44. An axial length of the projection 70 may also be sized relative to the aperture 64 such that the projection 70 abuts against an end of the aperture 64 to prevent the gap 54 between the stowed fanlet 22 and thrust reverser sleeve 44 from closing.

Figure 5:
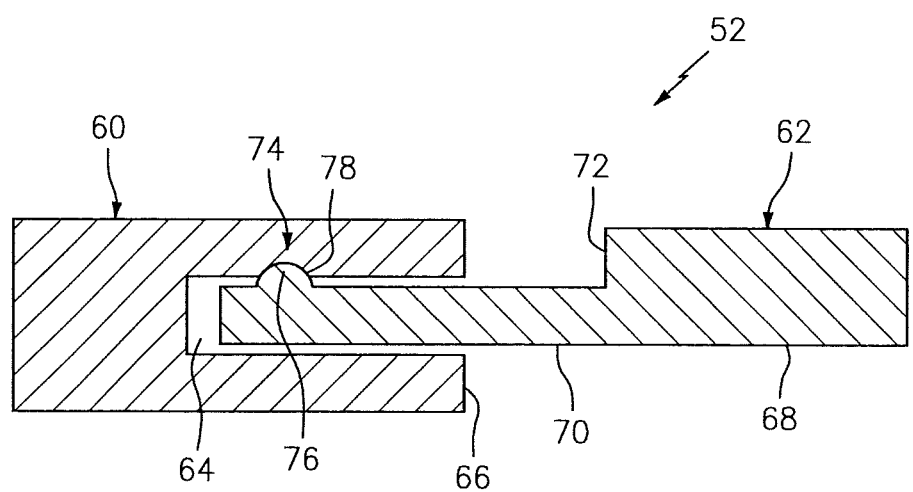
FIG. 5 is a side sectional illustration of a pair of mated interlocking components.

Expansion of the gap 54 may be limited or eliminated by, for example, preloading the thrust reverser sleeve 44 towards the fanlet 22 using thrust reverser sleeve actuators; e.g., hydraulic pistons, etc. In addition or alternatively, the interface assembly 52 may further include a lock 74 configured to selectively lock the mated interlocking components 60 and 62 together as shown in FIG. 5. The lock 74 of FIG. 5 includes at least one laterally extending rib 76 (or point projection), which projects out from a side of the projection 70 and mates with a corresponding recess 78 (e.g., groove or dimple) in the first interlocking component 60. By projecting radially into the recess 78, the rib 76 may substantially limit or eliminate axial movement between the mated interlocking components 60 and 62 and, thus, the stowed fanlet 22 and thrust reverser sleeve 44. Other types of locks, however, are known in the art and the present disclosure is not limited to any particular type or configuration thereof.

Referring again to FIG. 4, the first interlocking component 60A is disposed radially within and mounted to the fanlet 22 and, more particular, the fan cowl 28 at (e.g., on, adjacent or proximate) the aft end 30. The second interlocking component 62A is disposed radially within and mounted to the thrust reverser sleeve 44 at (e.g., on, adjacent or proximate) the forward end 38. However, in other embodiments, the first interlocking component 60A may be mounted to the thrust reverser sleeve 44 and the second interlocking component 62A may be mounted to the fanlet 22.

The first interlocking component 60A is also configured to reduce or eliminate relative radial movement between the stationary support 50 and the stowed fanlet 22 and thrust reverser sleeve 44. In particular, the first interlocking component 60A is configured to axially overlap and radially engage an outer distal end portion 80 (e.g., land portion) of the stationary support 50. This engagement may be an indirect engagement where, for example, at least one rub strip 82 is disposed between the first interlocking component 60A and the stationary support 50. This rub strip 82 may be mounted to the first interlocking component 60A or the stationary support 50. Alternatively, the engagement may be a direct engagement where the first interlocking component 60A radially contacts the stationary support 50; e.g., without a rub strip.

Figure 6:
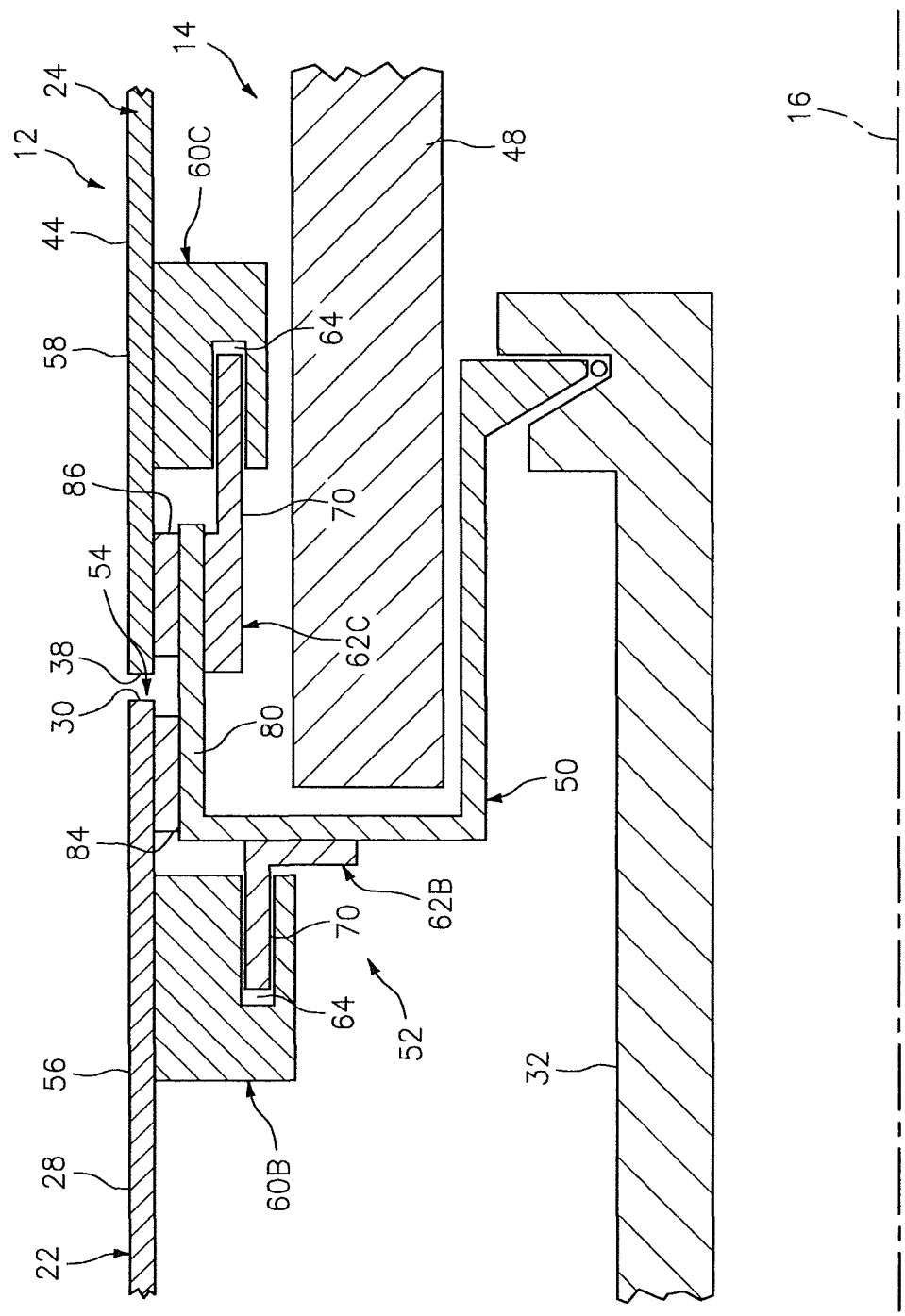
FIG. 6 is a side sectional illustration of a portion of the aircraft propulsion system at an alternative embodiment interface between the fanlet and the thrust reverser sleeve.

Referring now FIG. 6, the interface assembly 52 may alternatively include a first pair of interlocking components 60B and 62B and a second pair of interlocking component 60C and 62C. Each of these pairs of interlocking components 60B and 62B, 60C and 62C includes a first interlocking component and a second interlocking component, which may be configured similar to the interlocking components 60A and 62A described above with reference to FIGS. 4 and 5.

The first pair of interlocking components 60B and 62B are configured to maintain a relative axial and/or radial position between the fanlet 22 and the stationary support 50 at the interface in a similar manner as described above. The first interlocking component 60B is disposed radially within and mounted to the fanlet 22 and, more particular, the fan cowl 28 at the aft end 30. The second interlocking component 62B is disposed axially adjacent, forward of and mounted to an axial side portion of the stationary support 50. However, in other embodiments, the first interlocking component 60B may be mounted to the stationary support 50 and the second interlocking component 62B may be mounted to the fanlet 22.

The fanlet 22 and, more particular, the fan cowl 28 axially overlaps and radially engages the outer distal end portion 80 (e.g., land portion) of the stationary support 50. This engagement may be an indirect engagement where, for example, at least one rub strip 84 is disposed between the fanlet 22 and the stationary support 50. This rub strip 84 may be mounted to the fanlet 22 or the stationary support 50. Alternatively, the engagement may be a direct engagement where the fanlet 22 radially contacts the stationary support 50.

The second pair of interlocking components 60C and 62C are configured to maintain a relative axial and/or radial position between the thrust reverser sleeve 44 and the stationary support 50 at the interface in a similar manner as described above. The first interlocking component 60C is disposed radially within and mounted to the thrust reverser sleeve 44 at the forward end 38. The second interlocking component 62C is disposed on an opposite side of the stationary support 50 from the first interlocking component 60C. The second interlocking component 62C is also mounted to the stationary support 50. However, in other embodiments, the first interlocking component 60C may be mounted to the stationary support 50 and the second interlocking component 62C may be mounted to the thrust reverser sleeve 44.

The thrust reverser sleeve 44 axially overlaps and radially engages the outer distal end portion 80 (e.g., land portion) of the stationary support 50. This engagement may be an indirect engagement where, for example, at least one rub strip 86 is disposed between the thrust reverser sleeve 44 and the stationary support 50. This rub strip 86 may be mounted to the thrust reverser sleeve 44 or the stationary support 50. Alternatively, the engagement may be a direct engagement where the thrust reverser sleeve 44 radially contacts the stationary support 50.

In some embodiments, the interface assembly 52 may include one or more arrays of the pairs of interlocking components 60 and 62. For example, the interface assembly 52 of FIG. 4 may include a single pair of the interlocking components 60A and 62A. Alternatively, the interface assembly 52 of FIG. 4 may include an array of a plurality of pairs of the interlocking components 60A and 62A, where each pair is disposed at a discrete circumferential position about the centerline 16. Similarly, the interface assembly 52 of FIG. 6 may include a single pair of the interlocking components 60B and 62B, or an array of a plurality of pairs of the interlocking components 60B and 62B. The interface assembly 52 of FIG. 6 may also or alternatively include a single pair of the interlocking components 60C and 62C, or an array of a plurality of pairs of the interlocking components 60C and 62C.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A nacelle for an aircraft propulsion system, comprising:
   a stationary support extending circumferentially about an axial centerline;
   a fanlet including an inlet structure and a fan cowl, the fanlet configured to translate axially along the axial centerline;
   a thrust reverser sleeve configured to translate axially along the axial centerline; and
   an interface assembly providing an interface between the stationary support, the fanlet and the thrust reverser sleeve where the fanlet and the thrust reverser sleeve are respectively in stowed positions;
   the interface assembly configured to maintain a relative position between an aft end of the fanlet and a forward end of the thrust reverser sleeve at the interface;
   the interface assembly including a pair of interlocking components, wherein a first of the pair of interlocking components is mounted to the fanlet at the aft end of the fanlet;

the first of the pair of interlocking components configured with an aperture; and a second of the pair of interlocking components configured with a projection that extends axially into the aperture where the second of the pair of interlocking components is mated with the first of the pair of interlocking components.

2. The nacelle of claim 1, wherein the relative position comprises a relative axial position.

3. The nacelle of claim 1, wherein the relative position comprises a relative radial position.

4. The nacelle of claim 1, wherein the interface assembly is configured to maintain the relative position between the aft end of the fanlet and the forward end of the thrust reverser sleeve such that:

a predetermined axial gap is maintained between the aft end of the fanlet and the forward end of the thrust reverser sleeve; and an exterior surface of the fanlet is substantially radially flush with an exterior surface of the thrust reverser sleeve.

5. The nacelle of claim 1, wherein the interface assembly further includes a lock configured to selectively lock the pair of interlocking components together where the fanlet and the thrust reverser sleeve are respectively in the stowed positions.

6. The nacelle of claim 1, wherein the second of the pair of interlocking components is mounted to the thrust reverser sleeve at the forward end of the thrust reverser sleeve.

7. The nacelle of claim 6, wherein the interface assembly further includes a rub strip disposed radially between and contacting the first of the pair of interlocking components and the stationary support.

8. The nacelle of claim 1, wherein the second of the pair of interlocking components is mounted to the stationary support.

9. The nacelle of claim 8, wherein
the interface assembly further includes a pair of second interlocking components;
a first of the pair of second interlocking components is mounted to the thrust reverser sleeve at the forward end of the thrust reverser sleeve; and
a second of the pair of second interlocking components is mounted to the stationary support.

10. The nacelle of claim 9, wherein the interface assembly further includes a lock configured to selectively lock the pair of second interlocking components together where the thrust reverser sleeve is in the stowed position.

11. The nacelle of claim 9, wherein the interface assembly further includes a rub strip disposed radially between and contacting the thrust reverser sleeve and the stationary support.

12. A nacelle for an aircraft propulsion system, comprising:

a stationary support extending circumferentially about an axial centerline;
a fanlet including an inlet structure and a fan cowl, the fanlet configured to translate axially along the axial centerline;
a thrust reverser sleeve configured to translate axially along the axial centerline; and
an interface assembly providing an interface between the stationary support, the fanlet and the thrust reverser sleeve where the fanlet and the thrust reverser sleeve are respectively in stowed positions;
the interface assembly configured to maintain a relative position between an aft end of the fanlet and a forward end of the thrust reverser sleeve at the interface;
the interface assembly including a pair of interlocking components, wherein a first of the pair of interlocking components is mounted to the fanlet at the aft end of the fanlet;
a second of the pair of interlocking components mounted to the stationary support; and
the interface assembly further including a rub strip disposed radially between and contacting the fanlet and the stationary support.

13. A nacelle for an aircraft propulsion system, comprising:

a stationary support extending circumferentially about an axial centerline;
a fanlet including an inlet structure and a fan cowl, the fanlet configured to translate axially along the axial centerline;
a thrust reverser sleeve configured to translate axially along the axial centerline; and
an interface assembly providing an interface between the stationary support, the fanlet and the thrust reverser sleeve where the fanlet and the thrust reverser sleeve are respectively in stowed positions;
the interface assembly configured to maintain a relative position between an aft end of the fanlet and a forward end of the thrust reverser sleeve at the interface;
the interface assembly including a pair of interlocking components, wherein a first of the pair of interlocking components is mounted to the fanlet at the aft end of the fanlet;
a second of the pair of interlocking components mounted to the stationary support;
the interface assembly further including a pair of second interlocking components;
a first of the pair of second interlocking components mounted to the thrust reverser sleeve at the forward end of the thrust reverser sleeve;
a second of the pair of second interlocking components mounted to the stationary support;
the first of the pair of interlocking components configured with an aperture;
the second of the pair of interlocking components configured with a projection that extends axially into the aperture where the second of the pair of interlocking components is mated with the first of the pair of interlocking components;
the first of the pair of second interlocking components configured with a second aperture; and
the second of the pair of second interlocking components configured with a second projection that extends axially into the second aperture where the second of the pair of second interlocking components is mated with the first of the pair of second interlocking components.

* * * * *